J. F. G. P. HARTMANN.
ALTERNATING CURRENT RECTIFIER.
APPLICATION FILED DEC. 30, 1915.
1,306,335.
Patented June 10, 1919.
5 SHEETS—SHEET 1.
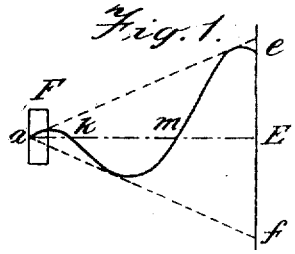
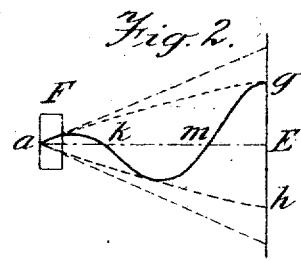
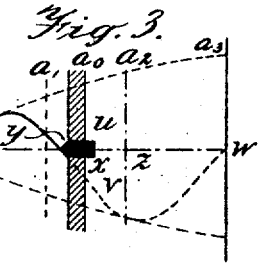
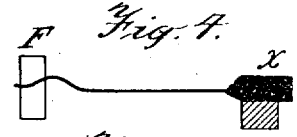
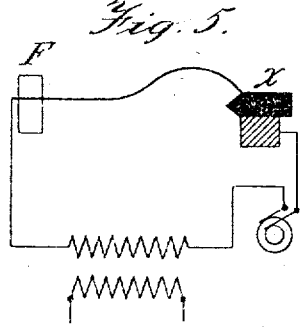
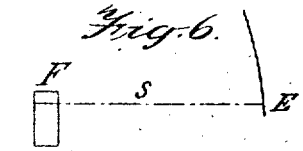
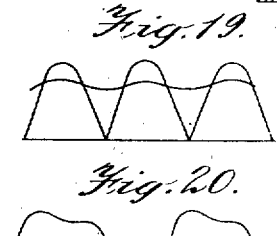
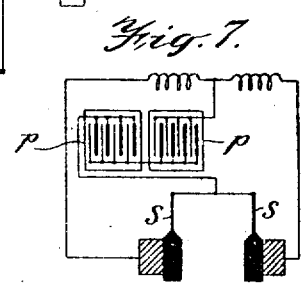
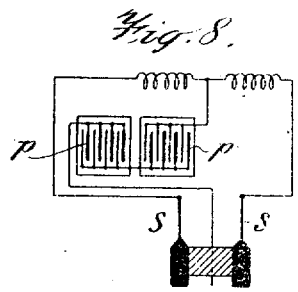
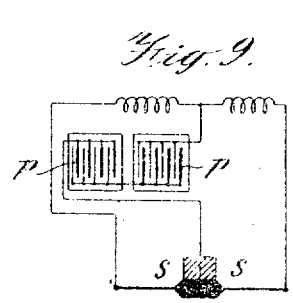
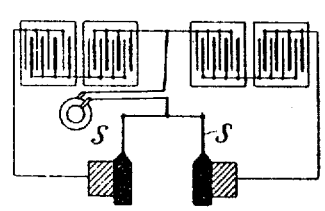
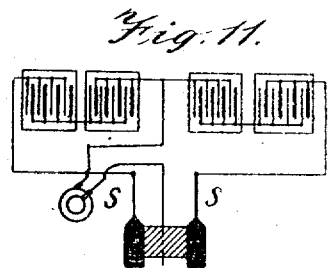
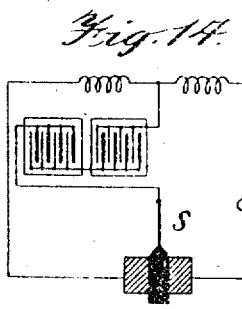
WITNESSES:
INVENTOR.
Julius F. G. P. Hartmann.
BY
Rosenbaum, Stockbridge & Borst
ATTORNEYS

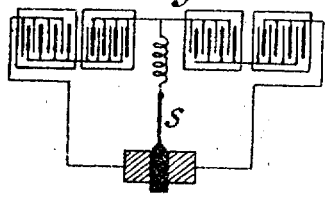
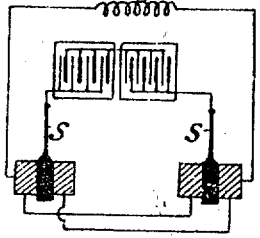
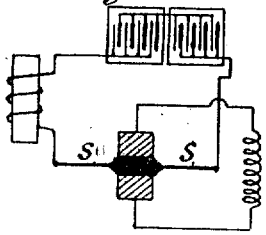
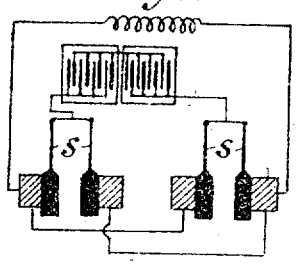
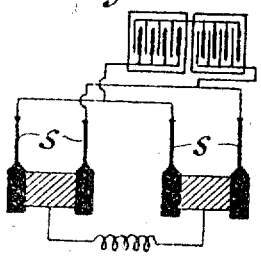
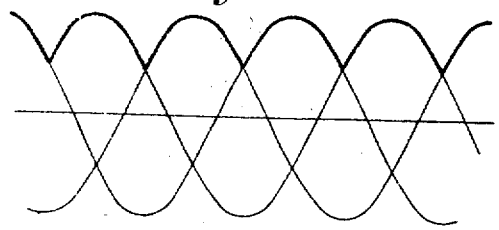
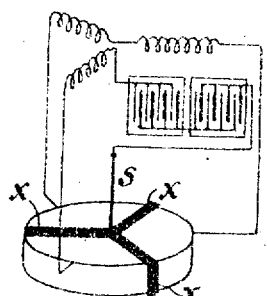
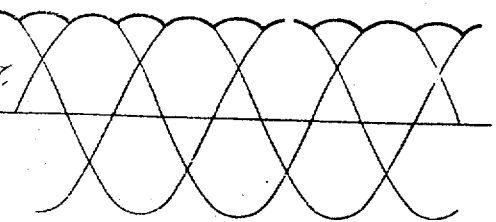
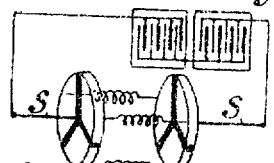
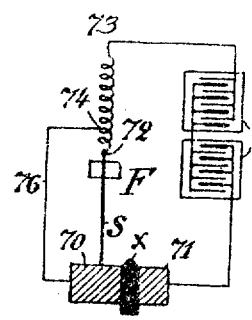

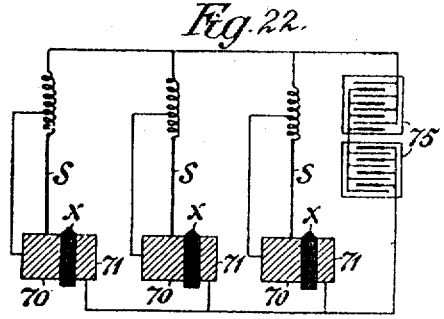
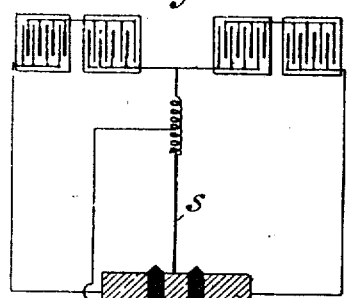
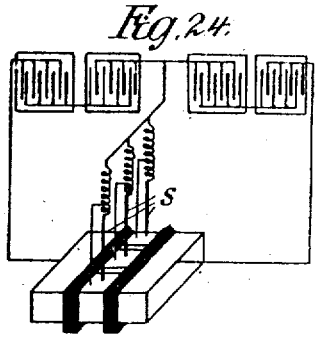
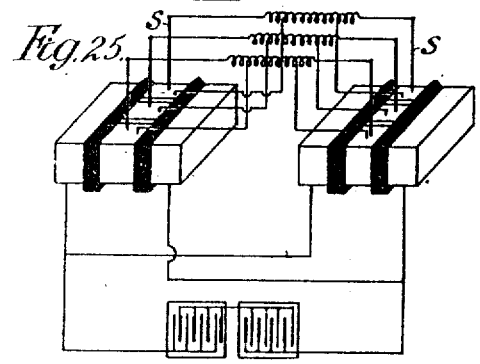
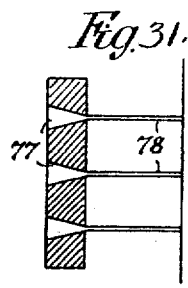
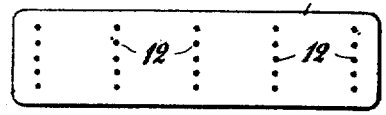
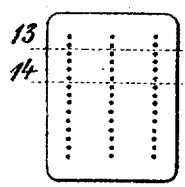

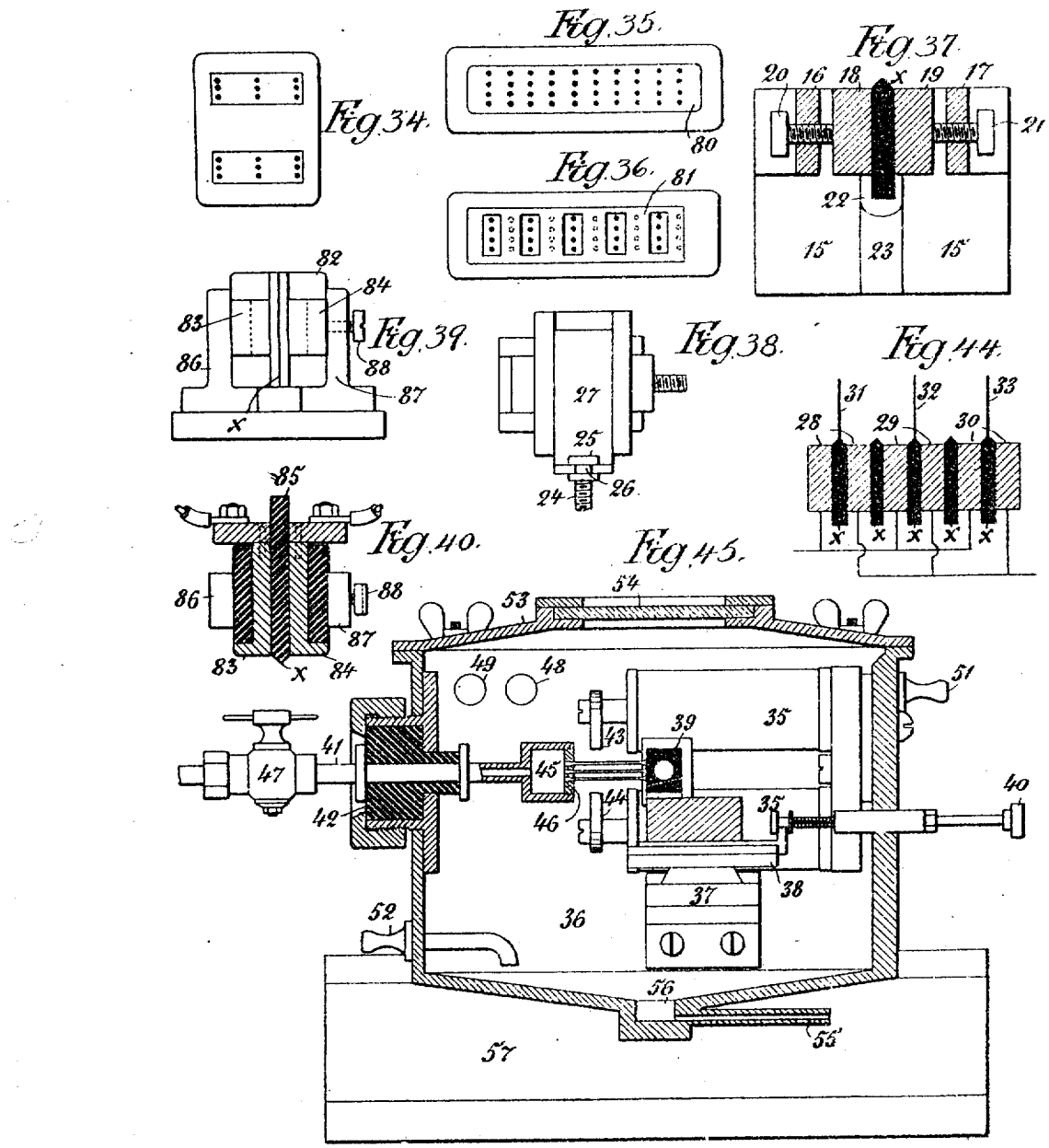

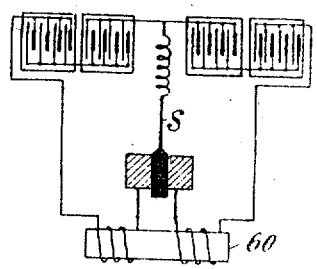
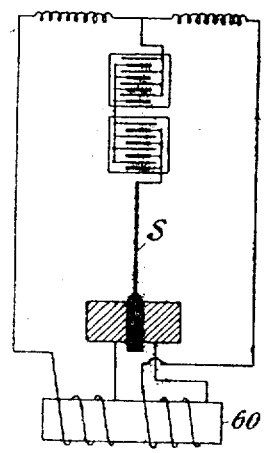
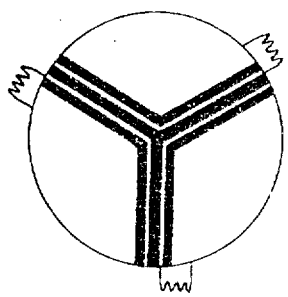
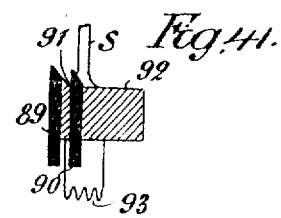
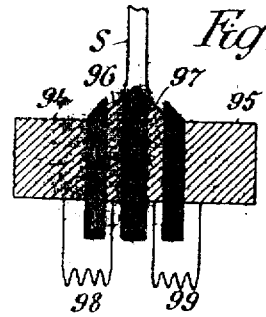

UNITED STATES PATENT OFFICE.

JULIUS FREDERIK GEORG POUL HARTMANN, OF COPENHAGEN, DENMARK.

ALTERNATING-CURRENT RECTIFIER.

1,306,335.  Specification of Letters Patent.  Patented June 10, 1919.

Application filed December 30, 1915. Serial No. 69,311.

*To all whom it may concern:*

Be it known that I, JULIUS FREDERIK GEORG POUL HARTMANN, a subject of the King of Denmark, residing at Copenhagen, Denmark, have invented certain new and useful Improvements in Alternating-Current Rectifiers; and I do hereby declare the following to be a full, clear, and exact description of the invention, such as will enable others skilled in the art to which it appertains to make and use the same.

The invention relates to an apparatus for transforming, especially rectifying, alternating or polyphase currents. The apparatus mainly consists of a system of one or more conducting liquid jets passing through a magnetic field which is perpendicular thereto and thereafter striking a combined or simple electrode arranged at a distance from the field dependent on the velocity of the jet and the frequency of the current.

The reason for placing the electrode at a certain distance from the field and the dependency of the said distance on the velocity and the frequency will hereafter be explained.

In the accompanying drawings,

Figure 1 is a diagrammatic view showing the theoretical path of a current-carrying jet, influenced by a magnetic field;

Fig. 2 is a similar view showing the actual path of the current-carrying jet;

Fig. 3 is a diagrammatic view showing the jet associated with one form of double electrode;

Fig. 4 is a diagrammatic view of a simple rectifier or system in which a single electrode is employed;

Fig. 5 is a similar view of the same, showing, in addition, means for utilizing a portion of the rectified current for working an inductor;

Fig. 6 is a diagrammatic view showing an unsymmetrical arrangement of the field, jet and electrode;

Figs. 7, 8 and 9 are views of undulator rectifiers in which electromagnets are employed, energized by accumulators in series with the jet and in which single electrodes are employed, the same differing from each other merely in the arrangement of the electrodes.

Figs. 10, 11 and 12 are also views of undulator rectifiers in which the working branch of the circuit is divided while the source of alternating current is undivided;

Fig. 13 is a view of an arrangement similar to Figs. 10 to 12, in which a single jet or system of jets is employed in connection with a double electrode;

Fig. 14 is a view showing an arrangement similar to Fig. 13, in which the generator and working branches have been interchanged;

Fig. 15 is a diagrammatic view showing the use of two double electrodes in a single system;

Fig. 16 is a similar view showing a modified electrode arrangement and the use of a reaction coil in the working branch;

Figs. 17 and 18 are views of two further modifications showing undivided working and generator branches and the use of single instead of double electrodes;

Figs. 19 and 20 are current diagrams;

Fig. 21 is a view of one form of undulator rectifier for polyphase current;

Fig. 22 is a view of another form of the same in which a series of groups of elements like those of Fig. 21 are combined.

Fig. 23 is a view of an arrangement similar to Fig. 21, in which a duplication of the double electrodes there shown is employed;

Fig. 24 is a view showing three groups of the elements of Fig. 23 built together to produce a system for rectifying three-phase current by the use of both half periods in each phase;

Fig. 25 shows a modification of the system of Fig. 24, in which an undivided working branch is obtained;

Fig. 26 is a diagrammatic view showing in heavy lines the current yielded by proper adjustments of the system illustrated in Fig. 22;

Fig. 27 is a diagrammatic view showing in heavy lines a current which may be obtained in the working branch of the system of Fig. 25;

Fig. 28 shows a rectifier for three-phase current employing an electrode made up of three conducting sectors separated by insulating walls;

Fig. 29 shows a rectifier of the type of Fig. 28, employing two jets and two electrodes;

Fig. 30 is a detail sectional view of a tube by which a single jet is formed;

Fig. 31 is a similar view of a bored plate, by which a series of parallel jets are obtained;

Fig. 32 is a face view of a plate with five rows of jet forming holes;

Fig. 33 is a similar view of a plate with three series of holes;

Fig. 34 is a similar view showing the jet systems arranged in groups in single plates;

Figs. 35 and 36 are face views of a plate and grating, in which the plate is provided with five pairs of hole rows and the grating acts to cover or close one row of each pair of rows;

Fig. 37 is a sectional elevation of a modified construction of double electrode;

Fig. 38 is a view of a double displaceable slide upon which the electrode of Fig. 37 is mounted for adjustment;

Figs. 39 and 40 are an elevation and a section respectively, of a further modification of the double electrode;

Fig. 41 is a detail sectional view of a form of the single electrode of Figs. 4 and 5 modified to counteract momentary short-circuiting by the jet;

Figs. 42 and 43 are similar views of the double electrode and polyphase electrode, similarly modified;

Fig. 44 is a detail sectional view showing a series of three double electrodes so arranged as to secure a greater amount of energy;

Fig. 45 is a sectional elevation of a complete rectifying apparatus embodying my invention, and Figs. 46 and 47 are views showing reaction coils and the manner in which they are inserted in the system.

If a liquid jet carries an alternating current and passes through a constant magnetic field whose lines of force are perpendicular to the jet and have a comparatively small component in the direction of the jet, waves are formed in the jet which advance at a speed approximately equal to the speed of the particles of the jet and at the same time increase in amplitude. As indicated in Fig. 1 in the annexed drawing, $a$ is the point where the jet enters the magnetic field F, the lines of force of which are perpendicular to the plane of the paper. According to an elementary theory the amplitude of the waves increases on the two lines $a$—$e$ and $a$—$f$, namely the lines according to which the jet would adjust itself if it carried direct current of one direction or the other, the intensity of the current being equal to the maximum value of the alternating current. Theoretically the wave length equals the distance through which the particles of the jet move during the period of the current. It has been found, however, that in actual practice the amplitude will become less than the theoretical amplitude due to damping of the wave, and the actual form of the wave will correspond to that illustrated in the diagram shown in Fig. 2.

If a surface perpendicular to the jet is considered, it is easily understood that the point at which the jet strikes the surface will oscillate on both sides of the striking point of the unbent jet. The time occupied by an oscillation will equal the period of the alternating current, but the movement will be retarded in comparison to the current. Provided the speed of the particles of the jet is constant, the phase-displacement will increase in proportion to the distance of the surface from the field. It follows that a number of equidistant planes will exist at which the striking point of the jet passes its middle position (i. e., the displacement ordinates are zero) at the same time that the current passes through zero. The first of these planes is found at a distance from the field equal to the distance through which the particles of the jet move during a half period of the alternating current. At this distance the phase-displacement is equal to $\pi$, i. e., the striking-point passes through the middle position only half a period after the change in direction of the current which causes the passage. The next surface is found at double this distance and corresponds to the phase-displacement $2\pi$. In short, the rule is that the distances of the surfaces from the field are multiples of the distance passed by the particles of the jet during the half period. If the velocity of the particles of the jet be 200 cm. and the half period of the alternating current .01 second, the surfaces will thus be found, 2, 4, 6, 8, etc., cm. from the field respectively.

If the jet carries direct current and passes through a short alternating field with lines of force perpendicular to the jet, it will assume a sinusoidal form similar to that assumed by the jet if it carries an alternating current in a constant field. In planes located as above described the striking point of the jet will pass its middle position contemporaneously with the zero intensity of the field.

The present invention is based upon the recognition of the above statements. Before describing the various forms of rectifiers according to the invention, some of their elements will be described. Fig. 3 schematically shows a magnetic field F, through which a jet passes entering at $b$ and striking a double electrode $u$, $v$, consisting of two plates, for instance of iron separated by an insulating wall $x$, the wedge-shaped edge of which projects somewhat beyond the surface of the plates $u$ and $v$. The unbent jet is first presumed to be directed against the edge of the wall $x$. If the electrode is arranged at one of the above named critical distances from the field, the striking point of the jet will pass over the edge of the insulating wall at the moment at which the current changes its sign. This means that the current is practically divided according to its direction between the two sides of the electrode, whereby the necessary conditions for rectification are created. It will be seen that the electrode must be arranged at one of the critical distances above described in order that a perfect separation of the two directions of current may be obtained. Owing to the thickness of the jet, however, it will for a moment touch both sides of the electrode; but in many cases the effect of this will be of practically no consequence, partly because the current value is approximately zero during the short circuiting and partly because the striking point is changing its direction at the maximum velocity during its passage over the insulating edge. When dealing, however, with large quantities of energy, the short-circuiting may mean a drawback. This is remedied by means of the special constructions of electrodes described below.

The described double-electrode may be conceived as a duplication of a single electrode which serves for cutting out an alternating current of one sign. Fig. 4 shows diagrammatically a simple form of such electrode. If the electrode is placed at a distance from the field equal to the distance through which the particles of the jet move during half a period of the alternating current under consideration or a multiple of this distance, each second half period only will pass through the electrode. If the distance from the field to the electrode is equal to the distance through which the particles of the jet move, when currentless, during a single half period, the direction of current passing through the jet and the electrode is the one that causes an upward bend of the jet, away from the electrode. This bend will, when the half period has elapsed, have reached the electrode, whereupon the front of the jet during the subsequent half period will be found outside the electrode, about as indicated in Fig. 5. Hence during this half period the current is interrupted. The following jet parts will therefore move straight ahead and after the elapse of the half period will again meet the electrode so that the current is closed again.

The diagrams of a series of complete rectifiers in which the above mentioned forms of electrodes are used will now be described. A simple system consists mainly in the parts shown in Figs. 4 and 5. It automatically cuts out one half period of an alternating current. The remainder of the rectified current can be used for instance for working of an induction coil. The system may thus form an automatic interrupter for working of an induction coil directly through an alternating current. It has been proved to be desirable to use a very strong field in order to obtain a sudden interruption of the connection between the jet and the electrode, and the latter element must be adjusted at a distance from the field substantially equal to the distance through which the particles of the jet move during the half period of the alternating current. When the jet is used as an interrupter for an induction coil, it acts in the following manner. At the beginning of a half period of the alternating current which is used, the jet closes the circuit. After the current has increased to a certain value which is reached toward the end of the half period, the bend formed on the jet will interrupt the connection with the electrode. Hereafter the current is interrupted and will remain so if the position of the electrode is correct during the entire following half period and will only be closed again at the beginning of the next following half period.

Experiments have proved that a certain dissymmetry in the arrangement of the three elements, field, jet and electrode, in relation to each other, is generally desirable in the alternating current interrupter here described. Care must therefore be taken that the jet cannot be interrupted at the direction of current not used. If the direction of current to be used produces a bend downward in the diagram shown in Fig. 6, the direction not used will produce a bend upward.

As stated, a rather strong field is required for the alternating current to insure regular and sudden interruption. The field can be produced by a permanent magnet of greater dimension than those common in Weston systems. If an electromagnet is to be used this can be constructed for working with dry or wet cells, or accumulators $p$, Fig. 7, inserted in series with the jet S in such a manner that they are kept charged through the rectified alternating current.

The above described electrodes, the double electrode and the single electrode with their coöperating jet or system of jets and field can be used as parts of a number of rectifiers now in use. According to the principle on which they work, they may appropriately be designated as wave rectifiers. Figs. 7–18 show some diagrams for such rectifiers.

Figs. 7–9, which only differ by the arrangement of electrodes, may be composed of two single electrodes with coöperating jets and fields. The latter are not indicated in the drawing. The source of alternating current, for instance the secondary winding of a transformer, is divided into two halves which alternately deliver current to the common working circuit. The current in the latter will, when the distance from field to electrodes is equal to a multiple of the distance passed by the jet particles during a half period, consist of the two half periods of the alternating current laid to the same side. This current, of course, may be modified by means of appropriate inserted reaction-coils. Fig. 19 shows diagrams of the non-modified and the modified current. In the diagrams shown in Figs 7-9 the current is used for charging a storage battery.

Figs. 10-12 show modifications of the systems illustrated in Figs. 7-9. The working branch is divided while the source of alternating current is undivided. Each half of the working branch receives current each second half period only. Through insertion of a reaction coil as described below the pulsating current can be modified about as indicated in Fig. 20. The rectifying system can then be used, for instance, for charging of a storage battery as indicated in the drawing.

From Fig. 13 it further appears that a single jet or a single system of jets suffice when the above described double electrode is used. The action of the system is similar to the systems shown in Figs. 10-12. In the double electrode system the generator branch and the working branch may be interchanged as indicated in Fig. 14; but in this case the jet will have to carry the rectified, in some cases modified, current. In order to make the jet oscillate in unison with the alternating current it is essential that it pass through an alternating field produced by the generator delivering the main current. Generally a synchronous alternating field should be used when the jets carry the rectified current. In all other cases the field is a constant field. If an alternating field be used it should be observed that generally the electrode should not be placed at a distance from the field equal to a multiple of the distance passed by the particles of the jet during the half period; but the distance must now be selected so that the phase displacement between the movement of the jet and the field due to the distance plus the phase displacement of the field in relation to the generator tension, measured cyclically, becomes a multiple of 2 π. It is however to be noted that at a certain phase displacement between field and working tension the electrode distances are determined by speed and frequency alone.

According to Fig. 15 two double electrodes are used in one system. Neither the generator branch nor the working branch need in this case be divided, and the two branches are of course interchangeable. Fig. 16 shows a modified electrode arrangement and a reaction-coil 61 inserted in the working branch. Finally Figs. 17 and 18 show two further modifications likewise with undivided working and generator branches, single electrodes being substituted instead of double electrodes.

In the diagrams shown the rectifier is always used for charging a storage battery. The rectified current, however, can of course be used for many other purposes, for instance electrolysis, arc-lamps, and for working direct current motors, etc.

The rectifiers hitherto considered have all been transformers for single-phase alternating current. The principle however permits them to be used not only for transforming of alternating current into direct current but also for transforming direct current into alternating current. The transformation of direct current into alternating current can be represented by the same figures as the transformers of alternating into direct current, the storage battery now representing the source of direct current while the source of alternating current is represented by the apparatus in which the alternating current is utilized, for instance the primary winding of a transformer. In some of the diagrams, for instance those shown in Figs. 7, 8, 9 and 10, the injurious sparking effect, which must arise by the use of a transformer, can be avoided when the jets are adjusted in relation to the electrodes or the latter in relation to the jets in such a manner that the transformer is kept short circuited for a short time at the changing from one direction of current to the opposite.

Referring to Figs. 21-31 a series of wave rectifiers for polyphase current will be described.

Such rectifiers can be composed of elements like that illustrated in Fig. 21. The arrangement here consists of the jet S, the constant field F and the double electrode 70, x, 71. The jet S, however, is not directed against the edge of the plate x as in the previously described modifications but against one of the electrode-parts, for instance 70. Two circuits, namely: the main circuit or the working circuit represented by S, 72, 75 and 71, in which are inserted the alternating or polyphase current 72-73, and the system 75 (for instance the indicated storage battery) which shall receive the rectified current, and: the auxiliary circuit S, 72, 74, 76, 70, in which only a small part 72-74 of the phase 72-73 (and in some cases a regulating resistance, not shown) is inserted. If the jet S pass an alternating current its striking point on the surface of the electrode will oscillate, but not symmetrically in relation to the edge of the plate x. The electrode half 71 will only be struck by the jet at the time of the maximum displacement of the striking point. If the electrode is placed at such distance from the field that the movement of the striking point is phase-displaced, a multiple of π in relation to the current, the electrode half 71 and the working circuit will receive a part of one current direction or half period. The remainder of this half period and the entire other half period is delivered to the auxiliary circuit, the resistance of which is adjusted in such a manner that the current does not suddenly vary during the passage of the striking point of the jet from one electrode half to the other. The auxiliary circuit thus serves to keep going the movement of the striking point. A very small amount of energy is required for this which is supplied by a small fraction of the working phase.

A plurality of elements like those here described can be built together. If three such elements are combined in the manner indicated in Fig. 22, a system is obtained which with a correct adjustment of the distances of the jets from the edges $x$ or of the amplitudes of the striking point in an induction free working branch 75 will yield a current as that represented by the heavy line in Fig. 26. The distance referred to is to be selected in such a manner that each of the sides 71 of the electrodes are touched by the jet during one third of the period. The current can be modified through insertion of a reaction coil. The lateral adjustment of the electrodes can be effected by means of a slide which is displaceable in the direction of movement of the striking point of the jet.

The system shown in Fig. 22 works with only one half period, or more correctly speaking with only part of the same on both sides of the maximum value. This system may, however, be doubled as shown in Fig. 23 as regards a single phase. The electrode here used is a doubling of that shown in Fig. 21. Three such elements built together as shown in Fig. 24 provide a system for rectifying a three phase current with the use of both half periods in each phase. The working branch must here be divided. An undivided working branch is obtained in the system shown in Fig. 25. This consists of two systems designed for three phases but can of course be built for any number of phases. When three phase current is used and a current like that shown in Fig. 27 with a heavy line is obtained in the working branch, it is to be observed that the jet must touch the outer electrode parts, each in one sixth of the period, and that the electrodes must be placed at a distance from the field equal to a multiple of the distance through which the particles of the jet move during one half period.

By the use of a rotating field produced by the generator of the polyphase current the latter can also be rectified. Fig. 28 shows a rectifier for three phase current. The electrode consists of three conducting sectors separated by insulating walls $x$. Influenced by the rotating field and the rectified current the striking point of the jet on the electrode will rotate at an angular velocity equal to that of the rotating field, thus synchronizing with the three phase current. The striking point will lag behind the field for an interval of time corresponding to the time required by the particles of the jet to move from the field to the electrode. In a given field and a given angular position of the separating walls of the electrode such conditions can always be obtained through suitable adjustment of the distance from the field to the electrode that the current through the jet and the working branch assume the character indicated in Fig. 26. Similar to the above a series of positions are found in which the electrodes can be located. The distances between the same is a multiple of the distance through which the particles of the jet move during the period of the phase. Fig. 29 shows a rectifier working with two jets and two electrodes. The phases need not here have a common point. It is obvious that systems corresponding to those shown in Figs. 28 and 29 can be constructed for any number of phases.

The operation of the described jet commutators will now be explained. The conditions affecting the stability of the jet renders it possible to cause the motion of the striking point and the current to coincide at ordinary frequencies. Coincidence in a constant field is obtained the first time, as has already been explained, at a distance from the center of the field equal to the distance through which the particles of the jet move during the half period (the phase displacement equal to $\pi$). If the pressure head of the conductive liquid is equal to 20 cm. of mercury the velocity will be about 200 cm. If the current is an ordinary technical alternating current of 50 periods, the distance in question will become a multiple of 2 cm., say 4 or 6 cm., i. e., the electrode is to be placed far within the limit of the coherent part of the jet at the dimensions of jet here in question.

The unavoidable losses incurred by the sparking resistance of the mercury jet, etc., when the undulating system is placed in a space filled with illuminating gas, hydrogen, alcohol vapor or the like, are very small compared to the amount of energy transformed. The loss is essentially proportional to the latter. As experiments have proved, this is approximately inversely proportional to the cross sectional area of the jets of the system. This area may be augmented as much as desired, partly by augmenting the cross section of the single jet, and partly by substituting for the single jet a plurality of jets. If the area is made sufficiently large for each kilowatt transformed the loss can always be kept at a minimum. A single jet of a diameter of about 1.5 mm. will suffice for economical transformation of about 1.5 kilowatt alternating current into rectified and modified current. A jet of three mm. diameter will thus be sufficient for 5-6 kilowatt, and a comb of jets of 5 jets will thus again suffice for transforming of 25 kilowatt and two such combs for 50 kilowatts. It appears from this that the wave commutator will constitute a very simple transformer.

It has been proved to be of the greatest importance that the parts of the electrode, the conductive as well as the insulating, should fully stand the load in the jets so that a corresponding small loss by sparks occurs.

Finally it is essential (and it does not present any difficulties at all) to keep the conductive liquid—generally mercury—so pure that a constant coherent jet can be obtained. The only requirement is that the diameter of the jet be not diminished below a certain limit, which, as experiments have proved, is approximately 1 mm.

The construction of the various parts of the invention will now be explained.

In systems for transforming small quantities of energy, for instance up to 5 kilowatts, one jet will suffice. The jet can be formed by means of a glass tube drawn out to a point of the shape shown in Fig. 30 or by means of a hole bored in a plate of iron or other material which is not attacked by the liquid. When larger quantities of energy are in question a system of parallel jets will be used, produced by means of a series of such bored holes as shown in Fig. 31. When such a plate is used the jets form a comb which in the rectifying systems here described must be arranged in the pole-line of the magnetic system. The number of jets in the single comb is of course limited by the circumstance that the air gaps between the poles of the magnet must be kept under a certain limit. In practical experiments as many as five jets have been used in a single comb.

For greater quantities of energy, however, a system of jet combs produced by corresponding systems of holes in a larger plate of steel, iron, copper or the like must be used. Fig. 32 shows such a plate with five rows of holes 12 corresponding to a system of electrodes built up similar to the electrode illustrated in Fig. 39 as referred to below.

The jet-hole plate, when only a single hole or a single comb is in question, may be screwed into the end of a tube which may be removable from the chamber of the apparatus. When systems of jet combs are in question the plate has an oblong shape. It then advantageously forms a wall in a chamber to which the liquid flows under pressure. If the diameter of the holes is over a certain limit there is no danger of the holes being obstructed by dirt or the like. If, however, the holes are desired readily accessible for inspection or interchanging, the hole-plate may form a slidable wall in the chamber into which the conducting liquid streams. This can be effected in various ways. Thus Fig. 33 shows a plate with three series of holes. In a certain position of the plate only a limited number of holes in the three rows are used, for instance those situated between the lines 13 and 14. By displacing the plate in the direction of the rows new holes can be rendered operative without interruption of the working. In Fig. 34 the jet systems are arranged in groups in single plates. When one group is used the other is positioned outside the chamber and can be cleaned. In Fig. 35 there is shown a system consisting of five pairs of hole-rows in a plate 80. Only one row in each pair is used at a time, the other being found behind a tight fitting grate 81, as shown in Fig. 36. By displacing the plate one set of rows may be rendered operative, and the other inactive. The latter construction has this advantage that the said displacement makes superfluous a slide for displacement of the electrode system perpendicular to the direction of the jets. The principle used in Figs. 35 and 36 may be extended so as to comprise groups of hole-rows with more than two rows in each group, as also the plate shown in Fig. 34 may be provided with more groups of holes than two.

Various forms of electrodes are diagrammatically shown in Figs. 7-18. Fig. 37 shows a modification which has proved to be practical. On a base 15 of slate or the like are arranged two uprights 16 and 17, and between the same the electrode-halves 18 and 19 and the insulating plate $x$ can be secured by means of screws 20 and 21. The securing of the parts 18 and 19 in the right position can be facilitated by notches in the underlayer. The parts 18 and 19 may be in the form of square plates. Each piece will thereby have eight edges, which can be successively arranged on the front edge of the porcelain plate which is the place where the electrode is met by the commutating spark. The insulating plate $x$ is larger than the parts 18 and 19. In the base 15 is carved a groove 22 to provide clearance for plate $x$. In the prolongation of the groove behind the electrode there is cut a slightly sloping groove 23 preventing accumulation of conducting liquid which might form a conducting bridge from one electrode to the other. The base 15 is generally arranged on the slide displaceable in the direction of the jet, the commutating requiring an adjustment of the length of the jet which is generally most easily effected through displacement of the electrode. The electrode may also be made laterally adjustable to permit an easy and convenient adjustment of the front edge of the plate $x$ in relation to the jet system. The slide may then be constructed as a double slide like that shown in Fig. 38. One adjusting-screw 24 ends in a head 25 with a groove 26 engaging an upright edge on the slide 27.

The described electrode is a double electrode. Each side of the electrode is connected by means of flexible wires with terminals insulated from the casing in which the system is arranged. A single electrode can advantageously be constructed like a double electrode, only one electrode-side being used.

Figs. 39 and 40 illustrate another modification of a double electrode. It consists in a block 82 of porcelain with two openings to accommodate the metal parts 83 and 84 against which the jet impinges. The prismatic edge $x$ and the plate 85 separating the parts 83 and 84 are integral with the body 82 and the unitary device can be placed between the uprights 86 and 87 and fixed by a clamping screw 88.

The two sides of the double electrode described above will during a short moment be short circuited by the jet. If the amplitude of the movement of the jet is sufficiently large this short circuiting will generally do no harm. It can, however, be counteracted by means of the arrangement illustrated in Figs. 41, 42 and 43. Fig. 41 shows a single electrode corresponding to that shown in Figs. 4 and 5. The insulating plate is, according to Fig. 41, divided into two pieces 89 and 90, between which is inserted a conductive lamination 91 which is connected with the part 92 of the electrode through a non-inductive resistance 93.

Fig. 42 shows a double electrode modified in a corresponding manner clearly illustrating the mode of operation. It will be understood that the jet S will in no case cause a short circuiting of the electrode parts 94 and 95, as two laminations 96 and 97 are inserted, each connected with the adjacent electrode part through a non-inductive resistance 98 or 99, respectively.

Fig. 43 finally shows a modified polyphase electrode and is self explanatory. It is to be understood that the insulating wall separating the various segments of the electrode have the cross section shown in Fig. 42.

In systems for transforming large quantities of energy the size of the series of electrodes must be correspondingly increased. Fig. 44 shows a series of three double electrodes 28, 29 and 30 each with one jet comb 31, 32 and 33 respectively. The double electrodes can be appropriately insulated from each other by means of plates $x$ similar to those separating the two sides of the single double electrode; two systems of electrodes are thus always available, which can be interchanged through lateral displacement with respect to the direction of the jets. It is observed, however, that the polarity of the two sides of the electrode change through this interchange.

Finally the electrode may consist of mercury found in two cavities in iron or copper bodies which during the working will keep filled with mercury when the electrodes are arranged horizontally, in which case the jet comb will be directed vertically.

The conducting liquid will ordinarily be mercury, the pressure head of the jets being generally between 20 and 50 cm. For lifting the mercury to such heights many means are available. In quite small systems, for instance, a water jet-pump may be used. In larger systems air under pressure may be used. A centrifugal pump may likewise be used in some cases. The work required for lifting the necessary mercury is insignificant.

Fig. 45 shows a practical modification of a complete rectifying system.

The electromagnet 35 is arranged in a chamber 36 of cast iron. The magnet is arranged on the rear wall in order to give room for the double slide 37, 38, carrying the electrode 39. By means of the screw 40 the slide 38 may be moved in the direction of the jets. The slides and the electrode may be of the kind above described. The pipe 41 is inserted through the insulating body 42 and ends in front of the pole-shoes 43, 44 in a chamber 45 into which the jet plate 46 is screwed. A jet system consisting of three jets is shown. The pipe 41 is provided with a steel cock 47. In the wall of the chamber 36 four terminal posts are arranged, two of which are indicated at 48 and 49, and two of them serve for feeding the electromagnet with current, and the two others are connected each with one side of the electrode. Further, the chamber is provided with a safety valve (not shown) and also with admission and exhaust openings 51 and 52 for illuminating gas, hydrogen, or other gas with which the chamber is filled when in operation. The chamber is closed at the top with a cover 53 provided with a window 54 of glass or mica. This window allows inspection of the jet system during the working. 55 is the drain pipe for mercury leading from a collecting cavity 56. The entire apparatus may be mounted on a base 57 of wood or iron. A chamber, the inner dimensions of which are 21 by 12.5 cm. and about 17 cm. depth, is sufficiently large for transforming 3-5 kilo watt.

Larger systems may be constructed by connecting smaller systems in parallel.

In the system for rectifying of simple alternating current, shown in Figs. 7-14, a reaction coil with two separate but otherwise alike windings, is used for modifying the rectified current. The manner in which this reaction coil is inserted in the system will appear from Figs. 46 and 47. One coil is inserted in one, the other in the other side of the rectifying system, and care must be taken that the currents in the two coils are magnetizing the iron core 60 of the reaction coil in the same direction. In systems where an unbroken rectified current is desired, a modification can be effected by means of a single reaction coil inserted in the path of the said current. In rectifiers like those shown in Figs. 15–18 a single reaction coil. for instance 61, Fig. 16, is used if necessary, for modifying, and this coil is inserted in series with the storage battery or the machine, lamp or the like. In parallel connected systems, each system may have its independent reaction coil or each system may have a coil arranged on a common iron core or finally all of the systems may have a common reaction coil.

I claim:

1. An electromagnetic system for rectification of an electric alternating current comprising a conductive liquid jet, means for producing a magnetic field crossed by the said jet, and means comprising an electrode for passing an electric current through the said jet, the said field and current being of such a character as to produce a periodical force acting on the said jet, the said electrode being located at a distance from the said magnetic field dependent upon the velocity of the particles of the said jet and on the frequency of the said periodical force, which distance will cause the striking point of the jet in the electrode to pass over the limitation of the electrode at moments of the periods of the alternating current required for rectification of the latter.

2. An electromagnetic system comprising a conductive liquid jet, means for producing a constant magnetic field crossed by the said jet, and means comprising an electrode for passing an alternating current through the said jet, the said electrode being located at a distance from the said field substantially equal to a multiple of the distance passed by the particles of the said jet during one half period of the said alternating current.

3. An electromagnetic system comprising a conductive liquid jet, means for producing a constant magnetic field crossed by the said jet, and means comprising an electrode for passing an alternating current through said jet, the said electrode being located at a distance from the said field substantially equal to the distance passed by the particles of the said jet during one half period of the said alternating current.

4. An electromagnetic system for rectifying a single phase alternating current, comprising a conductive liquid jet, means for producing a constant magnetic field crossed by the said jet, and means comprising at least one electrode for passing an alternating current through the said jet, the said electrode consisting of two conductive parts separated by an insulating protruding wall against which is directed the said jet, and said electrode being located at a distance from the said field substantially equal to a multiple of the distance passed by the particles of the said jet during one half period of the said alternating current.

5. An electromagnetic system for rectifying a polyphase electric current comprising at least one conductive liquid jet, means for producing a constant magnetic field crossed by the said jet, and means comprising an electrode for passing one phase of the said polyphase current through the said jet, the said electrode consisting of two conductive parts separated by an insulating protruding wall, the said jet being directed against a point at some distance from the said wall, the said electrode being located at a distance from the said field substantially equal to a multiple of the distance passed by the particles of the said jet during one half period of each of the phases of the said polyphase current.

6. An electromagnetic system for rectifying a polyphase electric current, comprising at least one conductive liquid jet, means for producing a constant magnetic field crossed by the said jet, and means comprising an electrode for passing one phase of the said polyphase current through the said jet, the said electrode consisting of three conductive parts separated by two insulating protruding walls, the said jet being directed against the middlemost of the said conductive parts, and the said electrode being located at a distance from the said field substantially equal to a multiple of the distance passed by the said jet during one half period of one of the phases of the said polyphase current.

7. An electromagnetic system for rectifying a polyphase electric current, comprising at least one conductive liquid jet, means for producing at least one rotary field synchronous with the said current, and means comprising at least one electrode for passing the rectified current through the said jet, the said electrode consisting of a number of conductive sector shaped parts corresponding to the number of phases of the said polyphase current, the said sector shaped parts being separated from each other by radial insulating protruding walls the said jet being directed against the center of the said electrode and the latter being located at a distance from the said field substantially equal to a multiple of the distance passed by the particles of the said jet during one period of each of the phases of the said polyphase current less a distance substantially depending on the velocity of the said jet, the frequency of the said current, the inductance of the coils producing the said magnetic field, and the angular direction of the said insulating walls of the said electrode.

8. An electromagnetic system comprising a plate having perforations for the formation of at least one conductive liquid jet, means for making some of the said perforations operative and the remainder of them inoperative, means for producing a magnetic field crossed by the said jet, an electrode adapted to be hit by the said jet and located at a distance from the said field, and means for passing an electric current through the said jet and the said electrode, the said field and current acting upon each other so as to cause the said jet to vibrate.

9. An electromagnetic system comprising at least one conductive liquid jet, means for producing a magnetic field crossed by the said jet, an electrode comprising a plurality of metal pieces separated by and partly surrounded by insulating material and located at a distance from the said magnetic field, means for passing an electric current through the said jet and the said electrode which current will coact with the said field to cause the said jet to vibrate.

10. An electromagnetic system comprising at least one conductive liquid jet, means for producing a magnetic field crossed by the said jet, an electrode comprising a plurality of metal pieces separated by insulating material, resistances connecting some of the said metal pieces, said electrode being located at a distance from the said magnetic field, means for passing an electric current through the said jet and the said electrode which current will coact with the said field to cause the said jet to vibrate.

In testimony whereof I affix my signature in presence of two witnesses.

JULIUS FREDERIK GEORG POUL HARTMANN.

Witnesses:
CECIL V. SCHOU.
F. PEDERSEN.